Nov. 20, 1934.  H. E. MILLAR  1,981,739
IMPROVED DEVICE FOR THE PROJECTION OF MOVING ADVERTISING
MATTER, ANNOUNCEMENTS, AND THE LIKE
Filed July 31, 1933  2 Sheets-Sheet 1
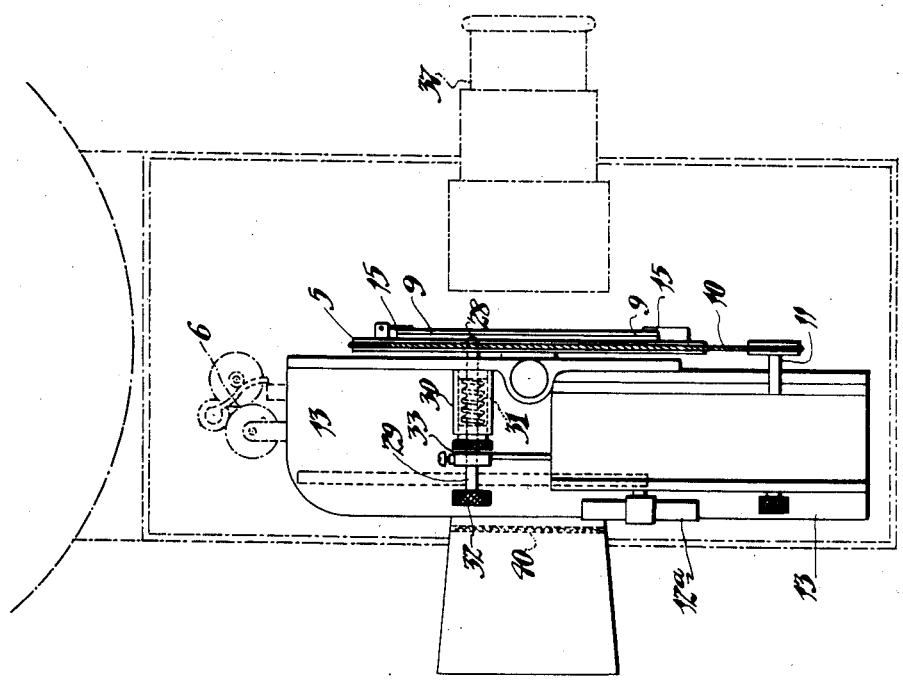
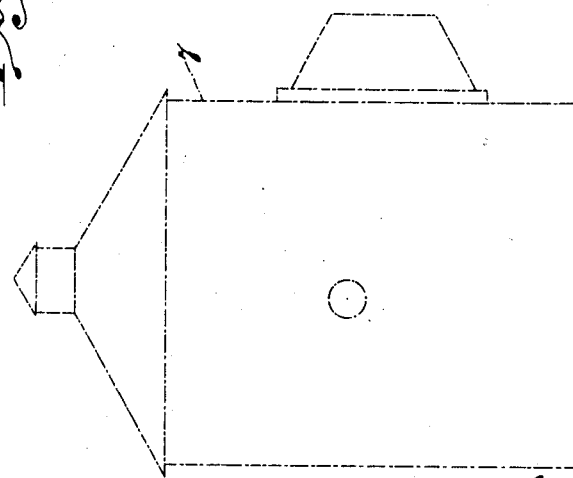

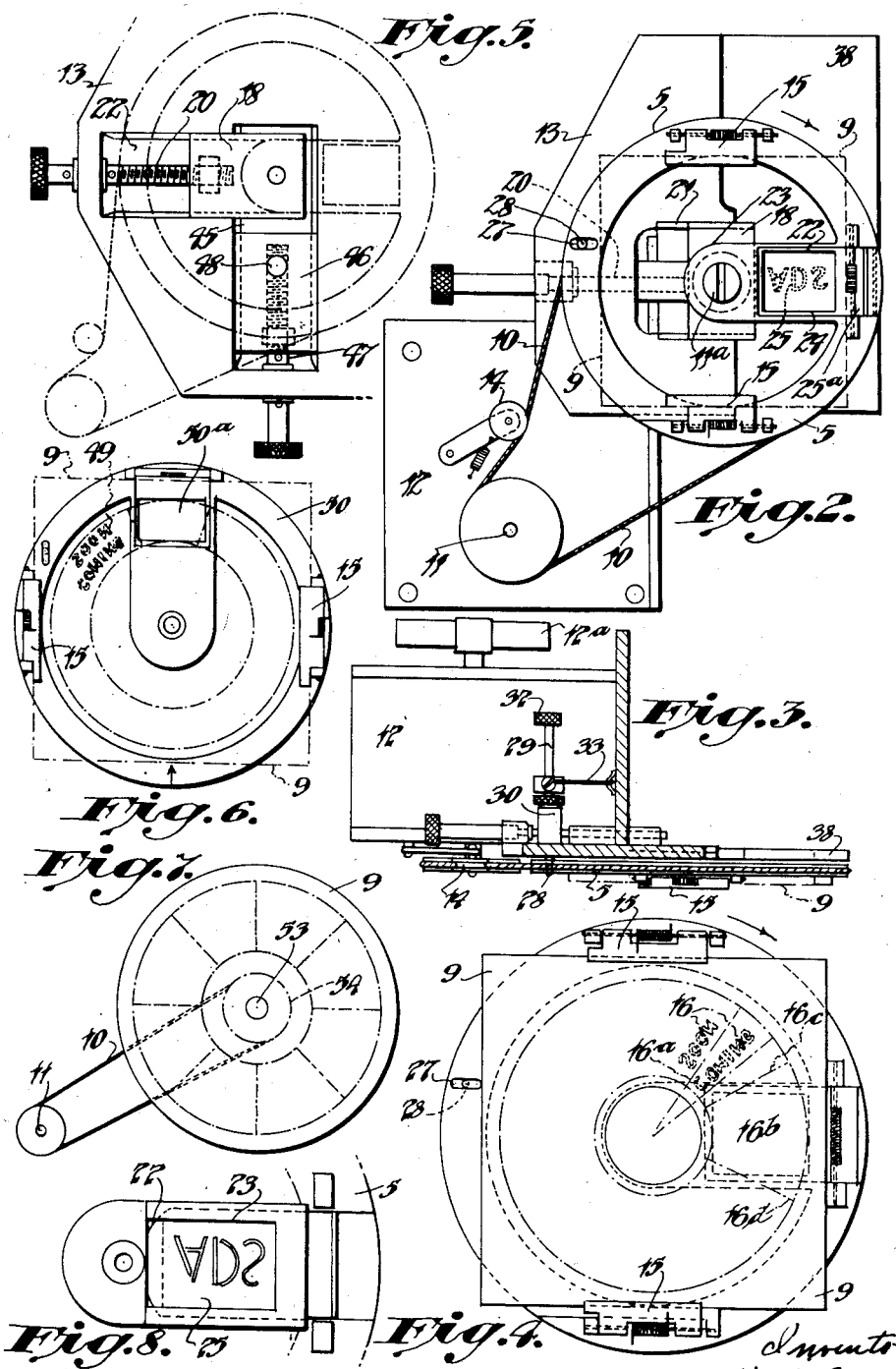

Patented Nov. 20, 1934

1,981,739

UNITED STATES PATENT OFFICE 1,981,739

IMPROVED DEVICE FOR THE PROJECTION OF MOVING ADVERTISING MATTER, ANNOUNCEMENTS, AND THE LIKE

Harold Ernest Millar, Windsor, near Melbourne, Victoria, Australia

Application July 31, 1933, Serial No. 683,053
In Australia August 5, 1932

7 Claims. (Cl. 88—27)

This invention has reference to an improved device for projecting moving advertising matter, announcements or the like on to a motion picture screen, advertising curtain, back cloth, scrim or any other suitable medium for advertising matter or picture film announcements, "coming attractions" or the like in order to improve the facilities and attractiveness of advertising or announcement projection to supersede the present system of still lantern slides and any other purpose for which the standard lantern slides are at present employed.

The object of my invention is to provide a device for projecting advertising or the like on a back cloth, screen or sheet wherein a rotary disc plate or slide of transparent or translucent material and having radially and concentrically arranged a series of announcements, advertising matter, "coming attractions" or the like, either separately, in sequence, or in continuity is rotatably mounted between a source of light and an arrangement of lenses whereby each radial and concentric section or portion of advertising matter or announcement is in turn projected in a continuous moving sequence on to the film screen or the like to assume an approximately vertical position so as to be readily perceivable and read by the audience and then pass off the screen preceding the projection of the next announcement, portion or section of advertising matter.

The invention is further characterized in that the device may be utilized as a separate unit in the form of an ordinary projector or lantern or it may be fitted to any standard motion picture projection machine or apparatus without requiring any adjustment or alteration to the said projection apparatus.

A further object of the invention is to provide a plate or disc on which is drawn, etched or photographed, a series of circumferential and radial sections of advertising matter, announcements or the like to be projected on the screen or the like, the rotary slide carrier being incorporated with a prime mover of any suitable type with means to release and cause the said carrier and slide or plate to rotate one revolution at a selected speed, each section of the advertising matter or announcement being rotated in turn through a path of light whereby the image is projected through a lens or series of lenses on to the screen or the like, and during the changing of the rotary slides, other advertising matter or the like is projected on to the screen by the device as will be described to provide a positive continuity of projection.

The device according to this invention includes means for providing for continuous projection of advertising matter or the like on the screen or the like during the interchanging of the main display or advertising slides or plates which are interchangeably mounted on a rotating disc, or slide carrier, the said means comprising mounting an independent detachable intermediate slide in the rotating disc or slide carrier in the projection aperture thereof to assume a normal position in the path of light whilst the rotating slide carrier is stationary during the interchanging of the main slides or plates whereby the matter on the intermediate slide is projected continuously during the intervals of the interchanging of the main slides or plates, thereby maintaining continuous projection on the screen or the like without any intermediate "black outs" during the changing of the main slides.

Other objects and features of the projecting device will be apparent from the foregoing description in relation to the accompanying drawings in which:—

Figure 1 is a view in side elevation of a device for projection constructed in accordance with this invention and applied to a standard biograph machine.

Figure 2 is a front elevation of the projecting device.

Figure 3 is a plan view of the projecting device partly in section.

Figure 4 is a detail view of the rotative slide carrier with a detachable plate or slide in position.

Figure 5 is a front elevation of an alternative form of the invention illustrating the means for mounting a slide carrier and slide for projecting the subject matter either from side to side or from bottom to top or vice versa on a screen.

Figure 6 is a front elevation of a slide carrier to be utilized for varying the position of the projection aperture.

Figure 7 is a view of an alternative means for mounting the rotative plates or slides.

Figure 8 is a view in detail of the intermediate stencil slide.

According to one form of carrying this invention into practical effect, the improved device for projection of advertising matter, announcements or the like on to a motion picture screen, advertising curtain and other mediums in a continuous moving sequence may comprise a self-contained unit to be utilized as a separate projection machine including a source of light comprising the usual arc lamp and a system of lenses, or alternatively, the unit may, with simplicity, be attached directly to the cinematograph or biograph machine as will be hereinafter described.

Figure 1 illustrates the application of the projection device to a cinematograph or biograph machine and in such application it will be noticed that the rotary disc or slide carrier 5 occupies a position immediately in front of and below the film gate 6 through which the film passes vertically downward for normal projection whereby it is unnecessary to make any adjustments or disc connections with the cinematograph or biograph machines.

The device comprises a hollow disc or slide carrier 5 adapted to rotate in the path of light from the usual arc lamp disposed in the lamp house or chamber 7, the carrier 5 having detachably mounted on its front side a detachable or interchangeable plate or slide 9 of any suitable shape and composed of a non-inflammable material of translucent or transparent nature.

The slide carrier 5 is circumferentially grooved to receive a flexible cord 10 from the driven spindle 11 of a prime mover such as suitable clock work mechanism, housed in a box-like casing 12 attached to the upright frame 13 of the device, a spring controlled tension roller 14 being mounted on the adjacent surface of the box casing 12 to impart the necessary tension to the flexible cord for rotating the slide carrier 5.

A handle 12a is fitted exteriorly of the box casing in order to wind the clock work mechanism within the box.

The interchangeable plates or slides 9 are retained in position on the side of the slide carrier 5 by means of spring controlled clips or framers 15 which have merely to be raised in order to remove a plate or slide 9 from the carrier 5 during interchanging thereof.

Each plate or slide 9 is formed with a series of circumferential sections of descriptive matter, figures or like matter for announcement purposes which is suitably photographed, drawn, etched or imparted to the surface of the transparent slide or plate by any other suitable method.

The sections 16 of descriptive matter or the like are concentrically arranged around the centre of each slide or plate with the matter emanating from the centre in a radial manner as illustrated at 16a in Figure 4, and a blank space 16b is left free of any descriptive matter or the like between the respective start and finish portions 16c and 16d respectively of the advertising or announcement matter concentrically arranged on the said slide or plate as illustrated in Figure 4.

The carrier 5 is mounted centrally on the driven spindle 11a the main end of which is recessed in an adjustable block 18 having a feed screw 20 to move same transversely in a slot 21 in the frame 13 in order to position the said carrier 5 and consequently the slide or plate 9 thereon in the positive projecting position within the source of light for accurate masking purposes.

At one side of the slide carrier 5 a rectangular projection aperture or recess 22 is provided in horizontal alignment with the central bearing 23 of the wheel, the said aperture 22, when the carrier 5 is stationary actually occupying the projecting position of the device.

The aperture 22 is provided with a recessed ledge 24 adapted to receive an interchangeable stencil slide 25 of the required size which thereby occupies a projection position during the stationary condition of the rotating carrier 5 and main slide 9 whereby, in each instance, on the rotatable slide or plate 9 coming to rest, the smaller intermediate slide 25 occupies the projection position behind and in alignment with the blank or free space 16b on the main slide or plate 9 and is accordingly projected on to the screen or the like in still form whilst the main slide or plate 9 is being removed from the carrier 5 to permit substitution of a new slide or plate, and the intermediate slide 25 is held in position on the aperture 22 by a spring controlled clip or framer 25a.

The intermediate or smaller slide 25 which is disposed in the projection aperture 22 on the slide carrier 5 obviously rotates therewith and therefore, as the carrier 5 commences a rotation, the image on the slide 25 is moved off the screen or the like and the first section 16c of the advertising matter or the like on the main slide or plate 9 is brought into view on the screen, whereby a continuity of projection on the screen or the like is achieved during the operation of the device herein described.

Diametrically and horizontally opposite to the aperture in the slide carrier 5 is a hole or slot 27 to receive the adjacent end 28 of a plunger 29 comprising the release means for setting in motion the said carrier 5 carrying the interchangeable slide or plate 9.

The plunger 29 is disposed in a sleeve 30 mounted to the frame of the device and is spring controlled as at 31, the outer end of the plunger having a head 32 for gripping purposes with a link 33 pivotally mounted thereto and extending into the clock work mechanism so that the release of the carrier 5, by the manipulation of the plunger 29 simultaneously sets the clock work mechanism in motion to effect the drive or one rotation of the carrier 5 and plate or slide 9 detachably mounted thereon.

The end 28 of the plunger 29 is normally seated in the hole or slot 27 formed in the rim of the carrier 5, with the intermediate stencil slide 25 occupying a position or projection in the path of light from the arc lamp, and as illustrated in Figure 1, wherein the device is attached to a biograph or cinematograph machine for the purpose of operation and it may be readily detached when the biograph machine is needed for projecting film.

When it is desired to use the device, a slide or plate 9 is positioned on the open side of the slide carrier 5 and secured by means of the spring framers or clips 15 with the intermediate slide 25 in a position of projection, that is, occupying the aperture 22 in the said carrier 5, the transparent nature of the blank space 16b main plate or disc 9 permitting of such projection.

The plunger 29 is pulled outwardly to release the slide carrier 5 and, in doing so, synchronously starts the clock work mechanism causing the said carrier 5 to rotate at a constant and uniform speed.

As the intermediate stencil slide 25 is mounted on the carrier 5, the movement thereof causes the projected image on the screen to move over and out of view simultaneously with the first radial and concentric section or portion 16c of descriptive matter, announcement or the like of the main plate or slide 9 coming into view.

The direction of rotation of the carrier 5 is such that the projected image on entering the path of light rays is directed firstly on to the bottom of the screen and then passes upwardly in a curved manner to assume approximately a vertical position in which condition it is readily perceivable and/or readable by the audience and the continued motion of the carrier 5 causes the matter in the first section or portion of the slide 9 to pass upwardly and over the top of the screen or the like as it leaves the area of the path of light which is simultaneous with the commencement of the projection of the next or successive section of announcement or continuation thereof, of descriptive matter or the like, the continued rotation of the carrier 5 causing the projection in turn of the whole series or portions of advertising matter, announcement or the like formed on the main plate or slide 9.

In this manner, a moving projection of the advertising matter or announcements or the like on the main slide 9 is effected which creates an attractive moving and continuous projection of the nature of the whole matter on the said plate or slide.

The stencil slide 25 may be interchanged during the rotation of the main slide or plate 9.

The carrier 5 continues its rotation until the hole or slot 27 in the rim thereof is brought into contact with the plunger end 28 which then snaps into the hole or slot 27 and causes same to become stationary, while the inward movement of the plunger 29 cuts out the clock work mechanism which stops the carrier 5 in its normal position with the intermediate stencil slide 25 again occupying the projection position, so that the advertising matter or the like on this intermediate slide 25 is projected on the screen whilst the operator changes the main slide or plate 9 in order to commence the sequence of operations previously described.

As is illustrated in Figure 1, the carrier 5 and attached slide 9 occupies a position between the lamp chamber 7 and the lenses 37 immediately in front of the projection position through which the biograph film is normally fed so that whilst the device is in operation, the matter on the slide or plate 9 is projected through the normal lenses 37 in the said biograph machine.

The device may be attached to an ordinary slide projector in the form of a biograph lantern, and, accordingly, the carrier 5 would occupy a similar position between the lamp house and the arrangement of lenses, and, in each case, a mask 38 is mounted at the rear of the carrier 5 in order to set the subject matter of the discs or plates to required limits on the screen or the like.

In a self contained unit, the upright frame 13 of the device supporting the clock work or like mechanism and the rotatable carrier 5 is a gauze screen 40 or the like positioned at the rear thereof and disposed in the path of light in order to effect the breaking up of the light rays from the arc lamp and also to disperse the heat therefrom and thereby act as a cooling medium to the said device during its operation.

Although the projection of the descriptive matter has been described to effect a moving sequence of the various radiation sections of descriptive matter on the plate or slide 9 to move from the base of the screen or the like, upwardly in a curved manner to an approximate vertical position and then fade out over the top of the screen, it will be obvious that a reverse in the direction of drive will cause the moving sequence to follow an opposite movement from the top of the screen to the bottom thereof and by varying the disposition of the descriptive matter on the plate or slide while retaining its concentric nature will effect the projection thereof from prompt side to opposite prompt side or vice versa as desired.

As illustrated in Figure 5, the device may be provided with means for expeditiously mounting and positioning a slide carrier for slides or plates in which the projection of the descriptive matter, announcements or the like thereon is projected on the screen from side to side.

To facilitate such mounting of the slide carrier, the frame 13 of the device is provided with a vertical recess 45 in which a slidable block 46 is disposed having a feed screw 47 similar to the lateral feed screw 20 previously described, whereby, when it is desired to change the projection of the slide or plate, the horizontal block 18 in which the normal slide or plate is held is moved outwardly in its recess by the lateral feed screw and then the vertical block 46 is moved upwardly by its co-operative feed screw 47 to assume a central position to receive the type of slide carrier 50 illustrated in Figure 6, a slot or hole 48 being provided in the block 46 to receive the spindle to support the particular slide plate illustrated, whereon the matter is concentrically arranged as at 49 but in a circumferential manner and not radially as previously described while the projection aperture 50a in this carrier 50 is also in an upper vertical position so that the intermediate stencil slide may be positioned therein.

As the slide or plate and carrier 50 rotate through the path of light in alignment with the stationary position of the intermediate stencil slide, the concentric circumferential descriptive matter, announcements or the like thereon, by moving continuously through the path of light are projected in a continuous moving sequence in such a manner that each section or portion thereof is projected on to the lower portion of the screen to move radially across to assume an approximate vertical position so as to be readily perceivable or readable by the audience and then fade out over the other side of the screen, the direction of rotation of the slide carrier 50 governing the movement of the advertising matter, announcements or the like over the screen.

In this application of the device, the provision of the dual feed screws 20 and 47 for positioning the blocks for receiving either type of slide carrier 5 or 50 according to the projection on the screen as desired is particularly advantageous for outdoor use for projection on to the walls of buildings or the like, wherein a variation in the style or form of projection with respect to the movement in sequence of the matter across the screen or projection position would be advisable.

The feed screws 20 and 47 provide for expeditiously adjusting the slide carrier for various sizes of slides or plates to ensure that same rotate through the path of light.

Figure 7 illustrates an alternative form of mounting the rotatable slide or plate 9 and in this application of the projecting device, the necessity for a slide carrier of the type previously described is unnecessary.

Each slide or plate 9 is centrally bored out to be mounted on a spindle 53 to rotate in the path of light as previously described, while at the rear of the slide or plate a small grooved pulley 54 is mounted to receive the flexible drive from the spindle of the prime mover such as the clock work mechanism.

In this application of the invention, a continuous projection of the slide or plate is achieved to project the descriptive matter, announcements or the like thereon in a continuous moving sequence on to a screen as previously described, while it is not necessary to leave a blank space to permit of the projection of the intermediate stencil slide, otherwise the operation insofar as the projection of the rotary slide or plate is concerned is identical with that previously described.

What I claim as my invention and desire to secure by Letters Patent is:—

1. A device for the projection of moving advertising matter, announcements and the like, comprising a rotary slide carrier, an interchangeable slide mounted on said carrier and having thereon concentric and radial descriptive matter with a blank space between the commencement and finish portions of the descriptive or advertising matter, an intermediate stencil slide detachably mounted in a projection aperture formed in the slide carrier at the rear of the interchangeable slide and coinciding in area with the blank space, whereby the matter on the intermediate slide is projected on to a screen while the carrier is stationary or during the interchanging of the slides or plates, to effect continuity of projection.

2. A device for the projection of moving advertising matter, announcements and the like, comprising a rotary adjustable slide carrier, means on said carrier to detachably position an interchangeable slide having radial and concentric advertising matter on said carrier between a source of light and a lens with a blank space on said slide, a projection aperture on said carrier to receive a stencil slide to coincide with said blank space when the carrier is stationary, a prime mover to uniformly rotate said carrier, and means to synchronously actuate the prime mover and release said carrier to effect one complete revolution thereof to project the advertising matter in a continuous arcuate movement over a screen.

3. In a device for the projection of moving advertising matter, announcements and the like, comprising a rotary and adjustable slide carrier, means on said carrier to detachably position an interchangeable slide having radial and concentric advertising matter on said carrier between a source of light and a lens with a blank space on said slide, a projection aperture on said carrier to receive a stencil slide to coincide with said blank space when the carrier is stationary, a prime mover to uniformly rotate said carrier, and release mechanism operatively connected with said carrier and prime mover to permit the carrier to make one complete revolution.

4. In a device for the projection of moving advertising matter, announcements and the like, a rotary and adjustable slide carrier, means to detachably position an interchangeable slide having radial and concentric advertising matter on said carrier between a source of light and a lens with a blank space on said slide, a projection aperture on said carrier to receive a stencil slide to coincide with said blank space when the carrier is stationary, a slot formed in said carrier, a spring-controlled plunger normally in engagement with said slot, and a prime mover operatively connected with said plunger, the release of said plunger from said slot being adapted to synchronously actuate the prime mover to cause the carrier to make one complete revolution.

5. In a device for the projection of moving advertising matter, announcements and the like, a rotary and adjustable slide carrier, means to detachably position an interchangeable slide having radial and concentric advertising matter on said carrier between a source of light and a lens with a blank space on said slide, a projection aperture in said carrier to receive a stencil slide to coincide with said blank space when the carrier is stationary, a circumferential groove on said carrier, a prime mover with a flexible driving member leading around said groove to rotate said carrier, a slot in said carrier, a spring-controlled plunger having one end in engagement with said slot, and a link fitted to said plunger and operatively connected with the prime mover, whereby the disengagement of said plunger from the slot releases said carrier and synchronously actuates the prime mover.

6. In a device for the projection of moving advertising matter, announcements and the like, a rotary carrier, spring clips mounted on said carrier to detachably position an interchangeable slide thereon between a source of light and a lens, said slide having formed thereon radial and concentric advertising matter, means for adjusting said carrier to vary the position of said slide which is provided with a blank space, a projection aperture in said carrier to receive a stencil slide to coincide with said blank space when the carrier is stationary, a prime mover geared to said carrier, a slot in said carrier, a spring-controlled plunger having one end in engagement with said slot, and a link fitted to said plunger and operatively connected with the prime mover, the release of said plunger being adapted to synchronously actuate said prime mover to cause the carrier to make one complete rotation.

7. A device for the projection of moving advertising matter, announcements and the like, according to claim 1, and wherein a mask is positioned at the rear of the rotary carrier and slide or plate, whereby the advertising or descriptive matter to be projected on to the screen or the like in a moving sequence is set to required limits on the said screen.

HAROLD ERNEST MILLAR.